United States Patent

[11] 3,592,048

[72] Inventors Louis Philippe Maurice
 Paris;
 Guy Mongodin, Fresnes, both of, France
[21] Appl. No 858,553
[22] Filed June 27, 1969
[45] Patented July 13, 1971
[73] Assignee Societe Anonyme: Societe Alsacienne de
 Constructions Atomiques de
 Telecommunications et D'Electronique
 "Alcatel"
 Paris, France
[32] Priority Feb. 8, 1966
[33] France
[31] 48.870
 Continuation of application Ser. No.
 614,682, Feb. 8, 1967, now abandoned.

[54] PORTABLE HELIUM LEAK DETECTOR
 1 Claim, 3 Drawing Figs.
[52] U.S. Cl. .................................................. 73/40.7
[51] Int. Cl. ........................................... G01m 3/16
[50] Field of Search............................. 73/40.7;
 250/41.9 R; 324/33

[56] References Cited
 UNITED STATES PATENTS
2,996,661 8/1961 Roberts........................ 73/40.7 X
3,240,927 3/1966 Fite et al...................... 250/41.9

OTHER REFERENCES
Brochure; Bell & Howell; TEST PORT AND ROUGHING STATION, Nov., 1962; 4pp; Located in class 73: subclass 40.7

Brochure; General Electric; M- 60 MASS SPECTROMETER LEAK DETECTOR received in Patent Office June, 1963; pp 2— 11; Located in class 73 subclass 40.7

Primary Examiner—S. Clement Swisher
Assistant Examiner—William A. Henry, II
Attorney—Smythe and Moore ABSTRACT: The device concerns a portable helium leak detector wherein a first housing has the analyzer cell, the vacuum producing units and a vacuum connection arrangement to feed gas from the apparatus or arrangement that is being tested for leaks. If the helium gas to the unit being tested leaks and is fed to the analyzer cell, it will determine such to provide a signal. The second housing has the electronic portions, the indicating means and the control switches, such being connected to the first housing by an electrical cable connection. The second housing is separate from the first housing and is adapted to be placed close to the operators and remote from the first housing so as to be accessible to the operators so they can read the indicators and can operate the control switches.

PORTABLE HELIUM LEAK DETECTOR

This application is a continuation of our application Ser. No. 614,682 filed Feb. 8, 1967, now abandoned.

This invention relates to an easily transportable helium leak detector.

Leak detectors which are permanently installed, at a fixed operational station, and having dimensions and weight t8at make them untransportable, are already known in the prior art.

Since such leak detectors must include a pumping unit, a motor and all required electronic components for monitoring the measuring instrument indicating leaks, they cannot easily be moved.

It is an object of the invention to provide a particularly light and transportable helium leak detector.

In one aspect of the invention, the leak detector is composed of two distinct assemblies, one of them including an entire vacuum circuit, an analyzer cell, a cold cathode pressure gauge and its gauging device, and the second one including the electronic part of the equipment, namely the analyzer cell power supply, a DC amplifier, the pressure gauge power supply, measuring instruments and a control keyboard with a switch means.

These two assemblies are contained in two separate boxes provided with handles or other similar devices making their transportation easier, and which can be coupled together by a connecting wire for operating the electronic part of the leak detector.

Because the electronic circuits are separated from the pumping unit, such advantageously prevents the electronic circuits from being heated by the dissipation due to the power circuits of the pumps. Electronic circuits are known to be sensitive to undue heating.

The invention is more specifically described hereinafter by referring to the appended drawings in which.

Figure 1:
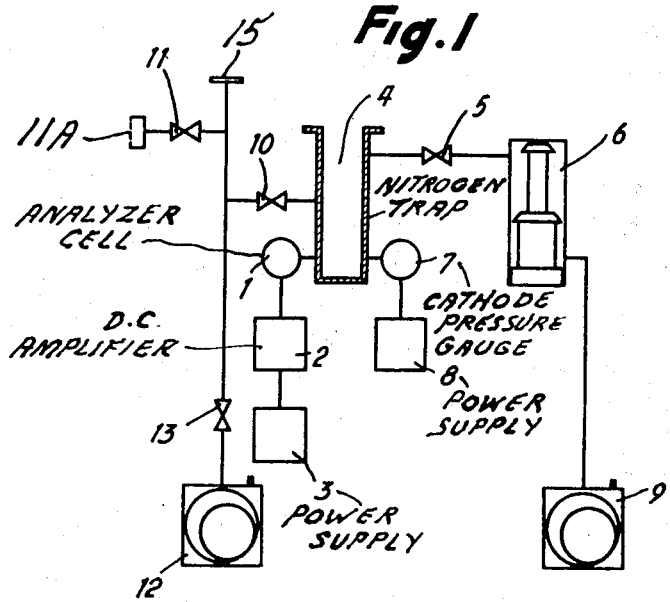
FIG. 1 is a schematic diagram of all elements of a leak detector according to the invention.

The leak detector according to the invention mainly includes the elements shown in FIG. 1.

Analyzer cell 1 is energized by a DC amplifier 2 that is in turn fed by a power supply 3.

The analyzer cell 1 is in communication with the pumping set including: a liquid nitrogen trap 4, a valve 5 for isolating the diffusion pump, an air-cooled diffusion pump 6, a cathode pressure gauge 7, the power supply unit 8 of said gauge and a prevacuum pump 9.

The pumping set is connected by an inlet valve 10 to the detector, an air inlet valve 11, a rough vacuum pump 12 and a rough vacuum valve 13. Air inlet valve 11 is connected to schematically shown filter 11A.

In a practical embodiment of the invention, the vacuum circuit consists in a compact vacuum pumping unit as described in U.S. Pat. No. 3,393,538 filed Oct. 26, 1966 which claims priority of a French patent application filed Oct. 27, 1965, and which is now French Pat. No. 1,464,716

Figure 2:
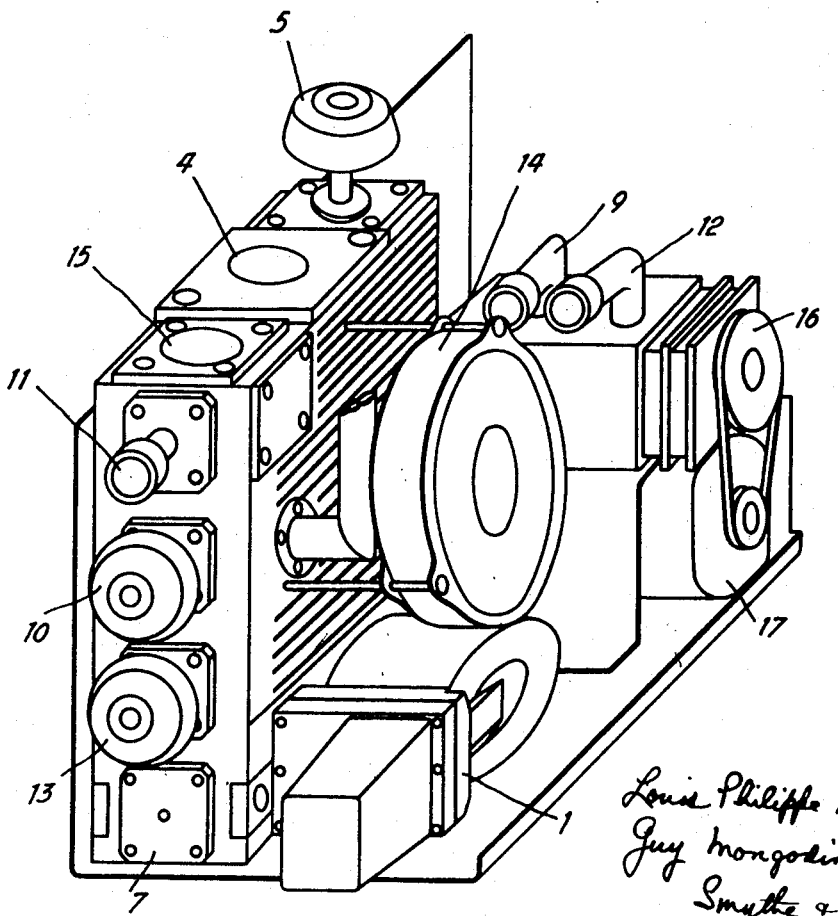
FIG. 2 is a perspective view of the pumping assembly.

This pumping set as seen in FIG. 2, shows: the liquid nitrogen trap 4, the isolating valve 5 for the diffusion pump, the air-cooled pump, the fan 14 of which can be seen, the cold cathode gauge measuring head 7, the inlet valve 10 to detector, the air inlet valve 11 and the rough vacuum valve 13.

It can be seen that the only connections that need to be made to establish the vacuum circuit are: the vacuum connection 15, the connection from the delivery pipe of the diffusion pump to the prevacuum pump 9, the connection to the analyzer cell and the connection to the rough vacuum pump 12.

Behind the vacuum unit can be seen the set of pumps 9 and 12, said pumps being suitably located within a single casing, the rotating parts being driven by a single shaft 16 that is rotated by a single motor 17.

Figure 3:
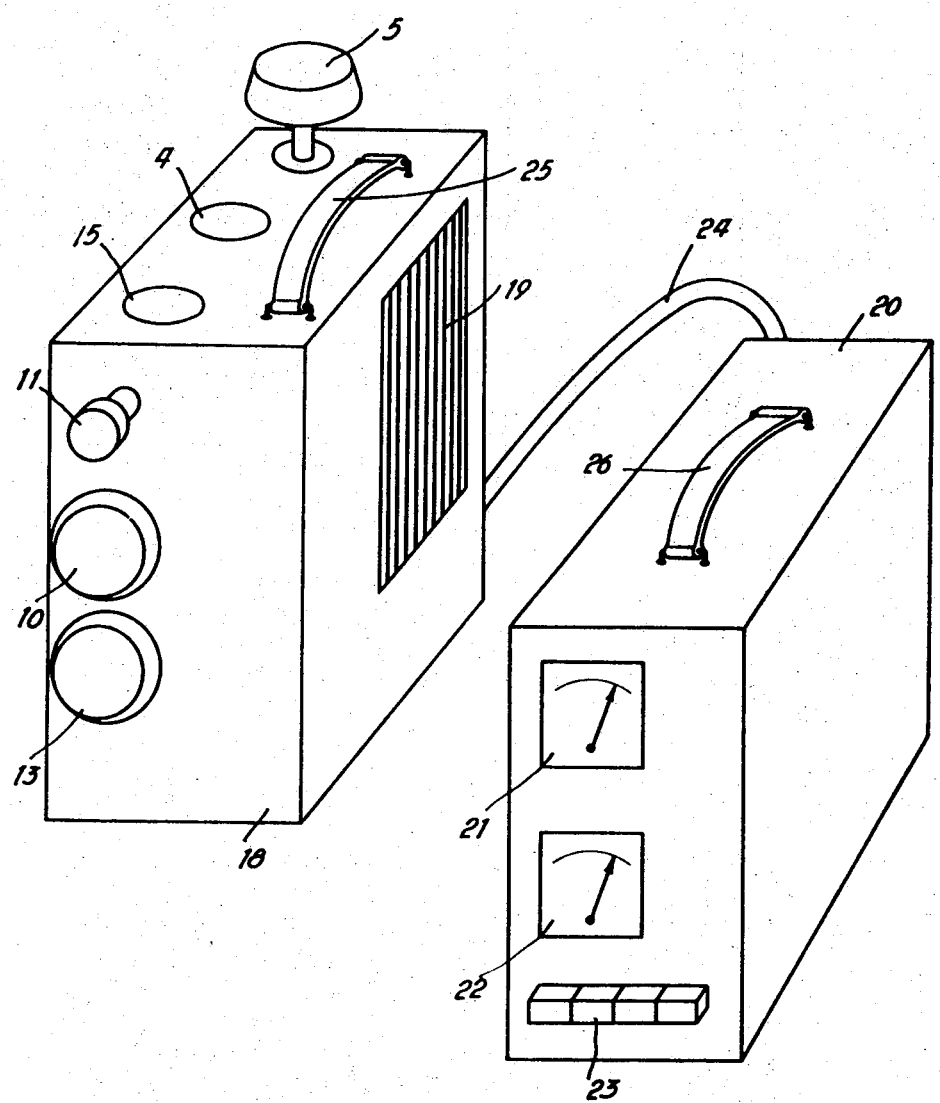
FIG. 3 is a perspective view of the entire equipment composed of the two assemblies.

Such an assembly forms a separate unit located in a box 18 shown in FIG. 3. This figure indicates the control knobs for valves 10, 11, 13, and 5, the vacuum connection 15 and the filling port of the liquid nitrogen trap 4.

Ventilating inlets 19 are provided through the wall of box 18.

The other elements of the leak detector, being only electronic circuits, are grouped within another box 20 forming a second separate unit.

Said unit includes the power supply unit 3 of the analyzer cell 1, the DC amplifier 2, and the power supply unit 8 of the cold cathode measuring head 7.

On the front face of box 20, the measuring instruments 21 and 22, and a control keyboard 23 with a press switch can be seen.

The two separate units 18 and 20 are coupled together by a connection wire 24 which includes the wiring between the analyzer cell 1 and pressure gauge 7 and the power supplies and related indicators.

Such a separation of the leak detector into two boxes makes it easily transportable, by providing two said boxes with handles or any other handling devices 25 and 26.

What we claim is:

1. In a portable helium leak detector, the combination including two pressure and generally similar portable housings, a first one of said housings having an analyzer cell and related apparatus including the detector vacuum pump unit, a cold cathode pressure gauge, vacuum connection means on said first housing, and means having a helium gas inlet connected to said vacuum connection means to feed a flow of helium gas to be tested to said vacuum connection means, and the second of said housings containing the electronic and indicating parts of the apparatus including the analyzer cell power supply, DC amplifier means, the pressure gauge power supply, indicating instruments and control switch means, and an electrical cable connection means between said assemblies, whereby said electronic parts including said control switch means in the second housing are separate from the first housing and will be shielded from heat dissipated by said pumping unit during handling and detection use of said housing assemblies, said second housing being adapted to be placed close to the operator thereof and remote from the first housing and said gas inlet of said means connected to said vacuum connection means is adapted to be placed where desired.

UNITED STATES PATENT OFFICE
CERTIFICATE OF CORRECTION

Patent No. 3,592,048                    Dated July 13, 1971

Inventor(s) Louis Philippe Maurice and Guy Mongodin

It is certified that error appears in the above-identified patent and that said Letters Patent are hereby corrected as shown below:

Column 1, line 8, "t8at" should be --that--; Column 2, line 40, "pressure" should be --separate--.

Signed and sealed this 7th day of December 1971.

(SEAL)
Attest:

EDWARD M. FLETCHER, JR.            ROBERT GOTTSCHALK
Attesting Officer                  Acting Commissioner of Patents